(12) United States Patent
Harvey et al.

(10) Patent No.: US 7,165,103 B2
(45) Date of Patent: Jan. 16, 2007

(54) METHOD AND SYSTEM FOR MATCHING NETWORK CLIENTS AND SERVERS UNDER MATCHING CONSTRAINTS

(75) Inventors: Nicholas J. Harvey, Redmond, WA (US); Laszlo Lovasz, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 835 days.

(21) Appl. No.: 10/180,734

(22) Filed: Jun. 26, 2002

(65) Prior Publication Data

US 2004/0003066 A1    Jan. 1, 2004

(51) Int. Cl.
*G06F 15/173* (2006.01)
*G06F 15/16* (2006.01)

(52) U.S. Cl. .................. 709/223; 709/203; 709/219; 709/225; 709/226

(58) Field of Classification Search ............... 709/239, 709/241, 203, 223, 219, 225, 226; 370/254–256, 370/351
See application file for complete search history.

(56) References Cited

U.S. PATENT DOCUMENTS

| | | | | |
|---|---|---|---|---|
| 5,761,507 A * | 6/1998 | Govett | .................... | 718/101 |
| 5,878,212 A * | 3/1999 | Civanlar et al. | ............ | 709/203 |
| 6,078,943 A * | 6/2000 | Yu | ............................. | 718/105 |
| 6,092,178 A * | 7/2000 | Jindal et al. | ................... | 712/27 |
| 6,195,680 B1 * | 2/2001 | Goldszmidt et al. | ........ | 709/203 |
| 6,259,705 B1 * | 7/2001 | Takahashi et al. | .......... | 370/465 |
| 6,330,602 B1 * | 12/2001 | Law et al. | ................... | 709/224 |
| 6,343,313 B1 * | 1/2002 | Salesky et al. | ............. | 709/204 |
| 6,601,101 B1 * | 7/2003 | Lee et al. | .................... | 709/227 |
| 6,671,259 B1 * | 12/2003 | He et al. | ..................... | 370/238 |
| 6,801,949 B1 * | 10/2004 | Bruck et al. | ................. | 709/232 |
| 6,804,709 B1 * | 10/2004 | Manjure et al. | ............ | 709/220 |
| 6,877,035 B1 * | 4/2005 | Shahabuddin et al. | ...... | 709/226 |
| 6,941,341 B1 * | 9/2005 | Logston et al. | ............. | 709/203 |
| 6,970,913 B1 * | 11/2005 | Albert et al. | ................. | 709/217 |
| 7,062,556 B1 * | 6/2006 | Chen et al. | .................. | 709/226 |
| 2002/0042721 A1 * | 4/2002 | Tillmanns | ....................... | 705/1 |
| 2003/0009558 A1 * | 1/2003 | Ben-Yehezkel | ............. | 709/225 |
| 2003/0161302 A1 * | 8/2003 | Zimmermann et al. | ..... | 370/363 |
| 2003/0191838 A1 * | 10/2003 | Tsao | ........................... | 709/225 |
| 2004/0054984 A1 * | 3/2004 | Chong et al. | ............... | 717/103 |

(Continued)

OTHER PUBLICATIONS

Sussman, "Instructor's Manual to 'Accompany Introduction to Algorithms,'" the MIT Press, © 1991.

(Continued)

*Primary Examiner*—Rupal Dharia
*Assistant Examiner*—Kristie D. Shingles
(74) *Attorney, Agent, or Firm*—Workman Nydegger (57) ABSTRACT

A method of finding an optimal match between clients and servers under given matching constraints utilizes a bipartite diagram in which the clients are presented as vertices on one side, the servers as vertices on the other side, and each possible client-server pairing allowed under the matching constraints as an edge connecting the vertices representing the client and the server. After an initial round of assignments is performed, the assignments are optimized by an optimization operation that iteratively applies a reassignment process. The reassignment process searches for a chain of servers starting with a server having a highest number of clients and ends with another server with a client number less than that of the first server by at least two, with each server in the chain except the end server having a client reassignable to the next server in the chain. Those reassignable clients are then reassigned along the chain such that the first server's client number is reduced by one and the end server's client number is reduced by one. The reassignment process is repeated until an optimal match is reached.

10 Claims, 9 Drawing Sheets

U.S. PATENT DOCUMENTS

2004/0147267 A1* 7/2004 Hill et al. ............. 455/456.1

OTHER PUBLICATIONS

Horn, "Minimizing Average Flow Time with Parallel Machines," *Technical Notes*, National Bureau of Standards, Dec. 9, 1971, pp. 846-847.

Bruno et al., "Scheduling Independent Tasks To Reduce Mean Finishing Time," *Communications of the ACM*, Jul. 1974, vol. 17, NO. 7, pp. 382-387.

Graham et al., "Optimization And Approximation In Deterministic Sequencing And Scheduling: A Survey," *Annals of Discrete Mathematics* 5, 1979, pp. 287-326.

* cited by examiner

METHOD AND SYSTEM FOR MATCHING NETWORK CLIENTS AND SERVERS UNDER MATCHING CONSTRAINTS

TECHNICAL FIELD

This invention relates generally to computer network operations, and more particularly to a method for matching clients with available servers under given matching constraints.

BACKGROUND OF THE INVENTION

Matching available network servers with clients needing the services provided by the servers is a classic problem encountered all the time in a client-server networking environment. Due to various limitations and restrictions, a client may be able to work only with some of the servers and/or within certain time windows. If the servers that can work with the client are already busy serving other clients, the client would have to wait in line for its turn to be served. Without an effective way to control the matching of the clients to the servers based on their matching constraints, some clients may be assigned to servers with long queue lines and have to wait for a long time to be served while other servers are sitting idle. This not only results in a significant waste of the server resources but also causes unacceptable delays experienced by the clients.

This client-server matching problem is not peculiar to the computer world. Rather, it is manifested in various forms in real life. For instance, this matching problem can be presented as a so-called "Swiss Bank Problem." In this problem, there are a given number of bank tellers each speaking one of several different languages (e.g., German, Italian, French, Romansh, and English, etc.), and a plurality of customers waiting to be served. Each customer speaks one or more of the languages spoken by the respective tellers. As a result of the language constraints, each customer can only work with a subset of the available tellers. If the customers walking into the bank are arbitrarily put in lines in front of the tellers that speak their languages, the lines can be of significantly uneven lengths. As a result, some customers will have to wait in line for a long time while some tellers are not servicing any customer, and the total customer wait time is much higher than it should be.

Interestingly, even though the client-server matching problem is prevalent in networking applications, no simple and effective solutions to this problem have been proposed. For instance, there are certain "bipartite matching" algorithms that can be found in standard textbooks on algorithms. Those solutions, however, are too simple, as they can only handle the special case where each server can handle only one client. Thus, they are not useful for the much more common situations in which the number of the clients waiting to be served exceeds the number of the servers. In contrast, there are several algorithms of the minimum-cost maximum-flow type that may be used to solve the matching problem, but these solutions are too complicated because they try to handle additional characteristics of the problem, such as that some servers are faster than others or that some clients take more time to serve than others. Accordingly, they tend to be difficult to implement and slow in finding an optimal match. Thus, what is needed is an effective yet simple computer-executable method for finding an optimal matching between a plurality of clients and a smaller number of services, based on the matching constrains of the clients and servers. It will be appreciated that such a solution has wide applications in client-server networking applications.

SUMMARY OF THE INVENTION

In view of the foregoing, the present invention provides a method to find an optimal match between clients and available servers under given matching constraints of the clients and servers. The terms "clients" and "servers" are used here in a broad sense to mean a first group and a second group of entities, respectively, wherein each member of the first group is to be assigned to a member of the second group. The matching method of the invention is based on a bipartite diagram that presents the clients as vertices on one side, the servers as vertices on the other side, and each client-server pairing allowable under the matching constraints as an edge (or line) connecting the vertices representing the client and the server of the pair. An initial round of assignments is then performed to tentatively assign each client to a server according to the matching constraints. Using the preliminary assignments as a starting point, the client-server matching is optimized by applying a reassignment process iteratively until an optimal matching is achieved. In the reassignment process, a first server with the highest number of clients is identified. A search is then performed using the bipartite diagram to find a chain of servers that starts with the first server and ends with a second server whose number of assigned clients is less than that of the first server by at least two. Each of the servers in the chain, with the exception of the second server, has a client that can be reassigned to the next server in the chain. Client reassignments are then performed such that each server in the chain passes one client to the next server in the chain. As a result of the reassignments, the number of clients of the first server is reduced by one, and the number of clients of the second server is increased by one, resulting in a more even distribution of the clients. This reassignment process is repeated until no further improvement can be made, i.e., the match has been optimized.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

Figure 1:
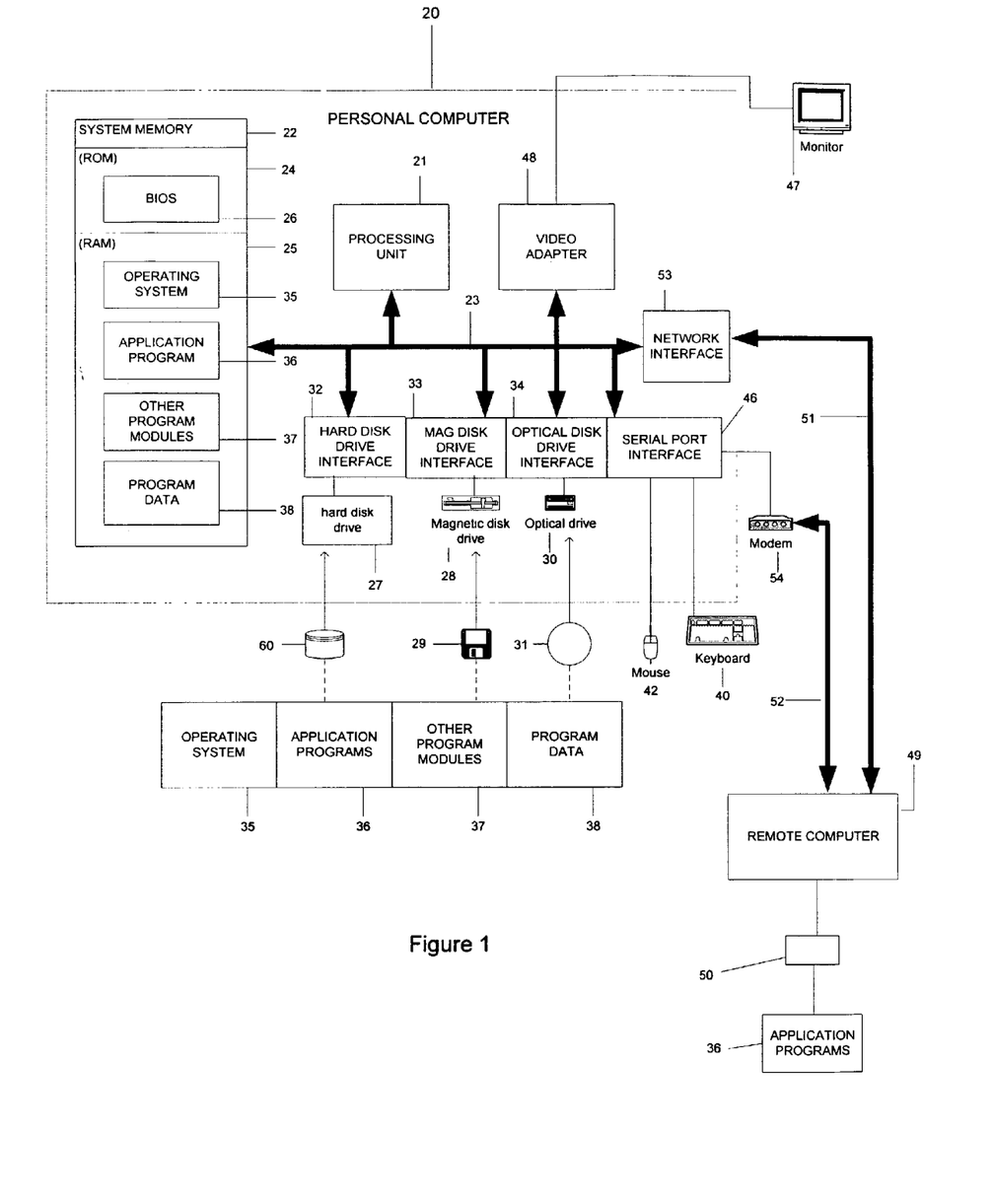
FIG. 1 is a block diagram generally illustrating an exemplary computer system on which components of a test framework in accordance with the present invention may be implemented.

The following description begins with a description of a general-purpose computing device that may be used for implementing components of an exemplary system of the invention, and the invention will be described in greater detail with reference to FIGS. 2–9 Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
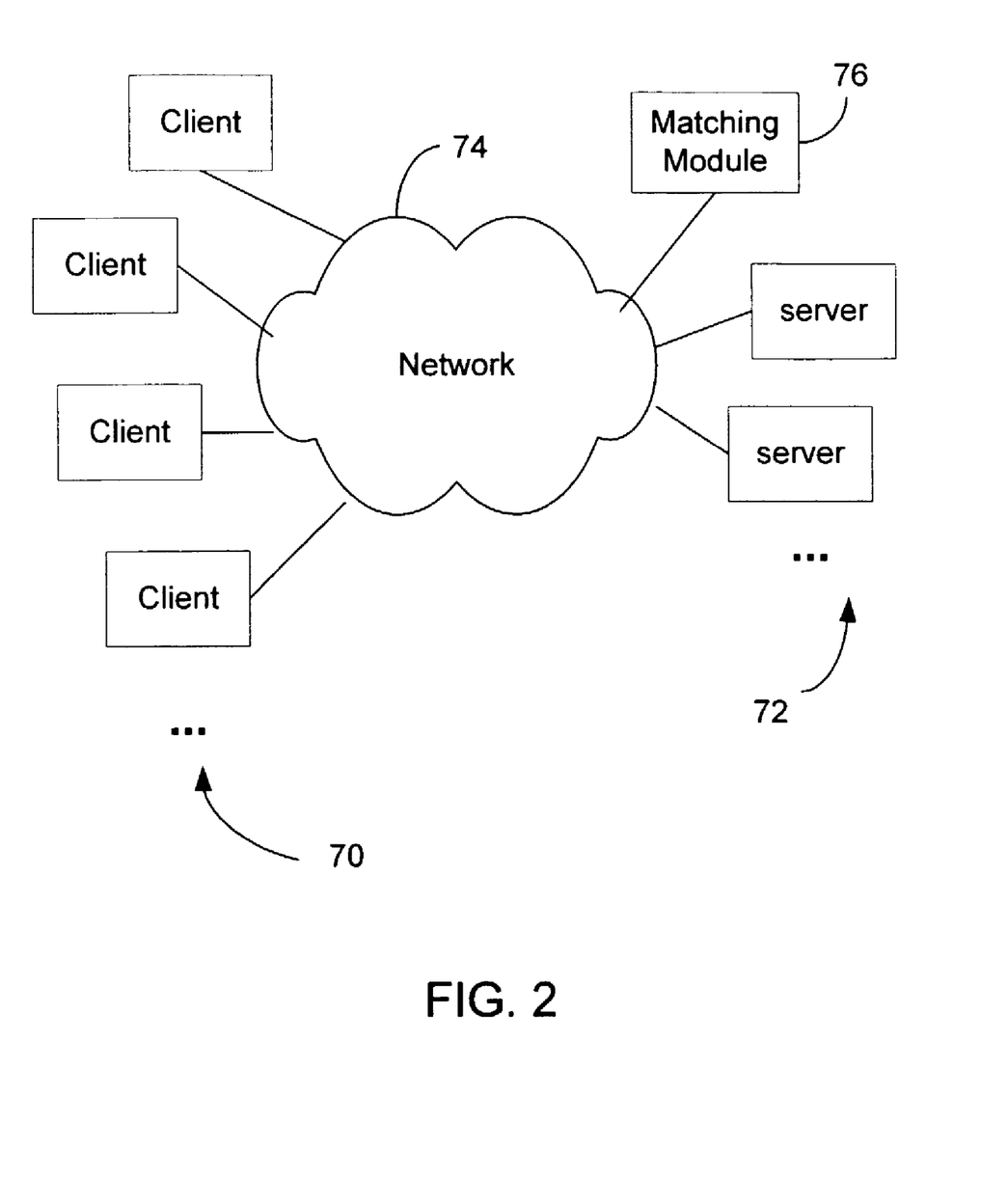
FIG. 2 is a schematic diagram showing a simplified view of a plurality of clients and a plurality of servers on a network, and a matching module programmed for finding an optimal match between the clients and the servers.

Referring now to FIG. 2, the present invention is directed to a new approach to solving the common problem of matching clients 70 on a network 74 to available servers 72 under matching constraints imposed by the clients and servers. The present invention allows an optimal match between the clients and servers under their matching constraints to be reached quickly and efficiently by a matching module 76 implementing the method of the invention. As described in detail below, the method presents a given client-server matching problem as a bipartite diagram, and iteratively adjusts client-server assignments until an optimal matching is found.

To explain the method of the invention in a way that is easy to understand and easy to relate to real-life experience, the following description uses a case of the "Swiss Bank Problem" mentioned above as a representative example of the general client-server matching problem. It will be appreciated, however, that the solution to the Swiss Bank Problem described below can be readily applied in a client-server networking environment, by viewing the bank customers as network clients and the bank tellers as available servers to be matched with the clients.

Figure 3:
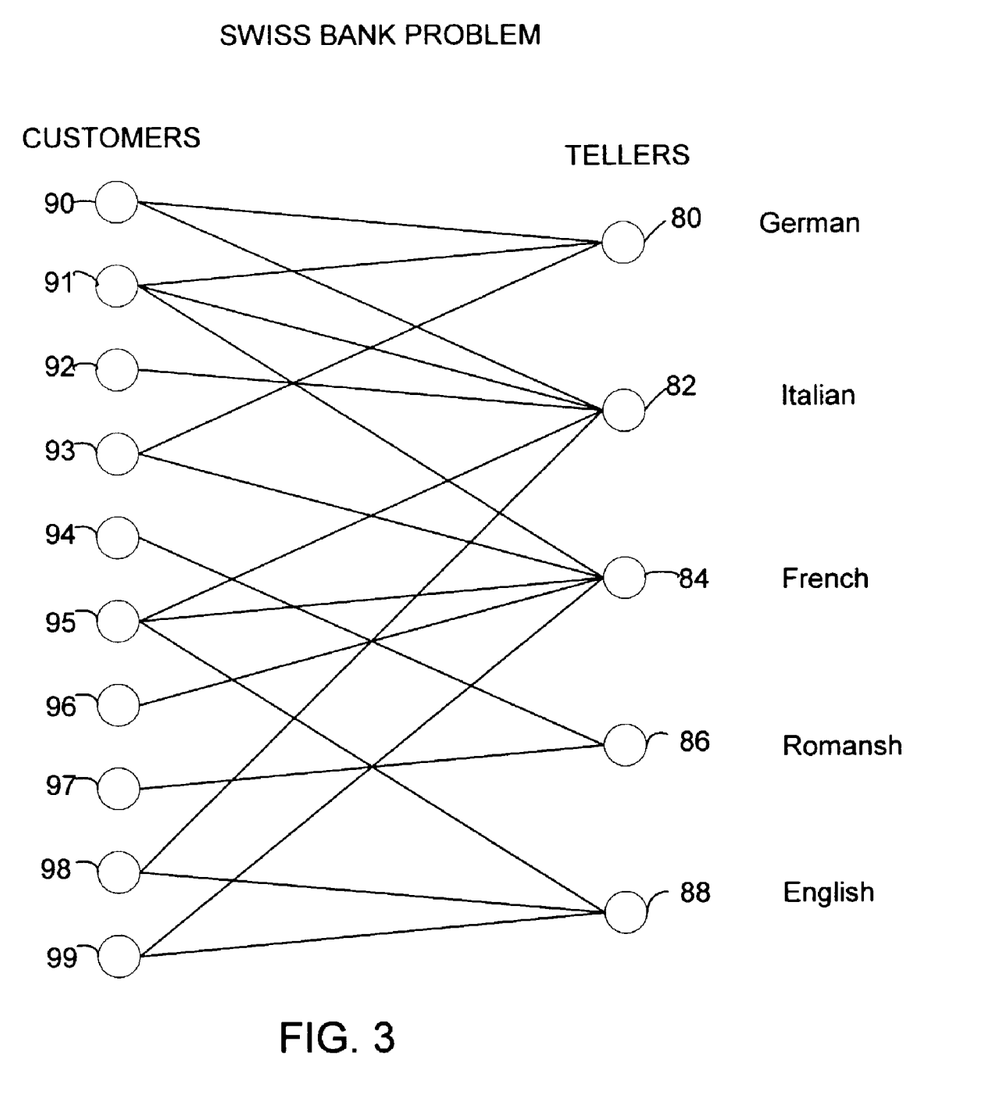
FIG. 3 is a schematic diagram showing a bipartite diagram for modeling a "Swiss Bank Problem," in which multiple customers are to be assigned to tellers speaking different languages.

The Swiss Bank Problem is presented in FIG. 3. In this particular example, there are five bank tellers 80, 82, 84, 86, and 88, each of which speaks only one of five languages: German, Italian, French, Romansh, and English. There are ten (10) customers 90–99 waiting to be served. Each of the customers can speak one or more of the five languages. The language capabilities of a given customer limits which bank teller(s) she can talk to. For instance, a customer that can speak German and Italian (e.g., the client 90) can be served by either the German teller 80 or the Italian teller 82, but not the other tellers. Thus, due to the matching constraints imposed by the languages spoken by the customers and the tellers, each customer can be matched to a subset of the available tellers. The task is to find an optimal match between the customers and the tellers under their matching constraints. In this case, a matching is optimal when either the total customer wait time is minimized or the variance of the tellers' loads is minimized (i.e., the lengths of the queue lines for the tellers are as even as possible).

As illustrated in FIG. 3, this customer-teller matching problem is presented as a bipartite diagram. In this diagram, each of the tellers is presented as a node on one side, and each of the customers is presented as a node on the opposite side. The languages spoken by a given customer are identified by lines connecting that customer to the tellers that speak those languages. For instance, the lines connecting the customer 95 to the tellers 82, 84 and 88 indicate that the customer speaks Italian, French, and English. In the parlance of bipartite matching, the nodes representing the tellers and the customers are called "vertices," and the lines connecting the customers and the tellers are called "edges." Generally, for a given set of clients and servers and their matching constraints, each edge represents an allowable pairing of a client and a server connected by the edge, and the edges in the bipartite diagram represent all the possible ways to pair up the clients and the servers under the matching constraints. The task of finding an optimal match is then to select one edge for each client from all the edges in the diagram such that the matching is optimized.

Once the bipartite diagram representing the customers and tellers as vertices and the allowable customer-teller pairing as edges is constructed as shown in FIG. 3, an optimal matching is found using the diagram. First, an initial round of assignments is performed such that each customer is tentatively assigned to a teller. After this initial round of assignments, the lengths of the queue lines (i.e., the numbers of assigned customers) of the tellers are likely to be uneven. This initial matching result is then used as the starting point for an optimization operation that iteratively applies a reassignment process in which a customer is removed from the queue line of a teller with a long queue line. This involves finding a chain of tellers that starts with the teller with the long queue line and ends with another teller with a queue that is shorter than that of the first teller by at least two. The tellers in the chain are selected such that each teller in the chain (except the last teller) has a customer that can be reassigned to the next teller in the chain. As will be described in greater detail below, the edges connecting the tellers in the chain and those re-assignable customers form a zigzag "alternating path." The re-assignable customer of each teller in the chain is then reassigned to the next teller in the chain. This reassignment process may be visualized as "shifting" the re-assignable customers along the teller chain. The end result of the reassignments is that the queue of the first teller in the chain is reduced by one and the queue of the last teller is increased by one, resulting in a more even distribution of the customers. This reassignment process is repeated until no further improvement can be made, i.e., the match is optimized.

Figure 4:
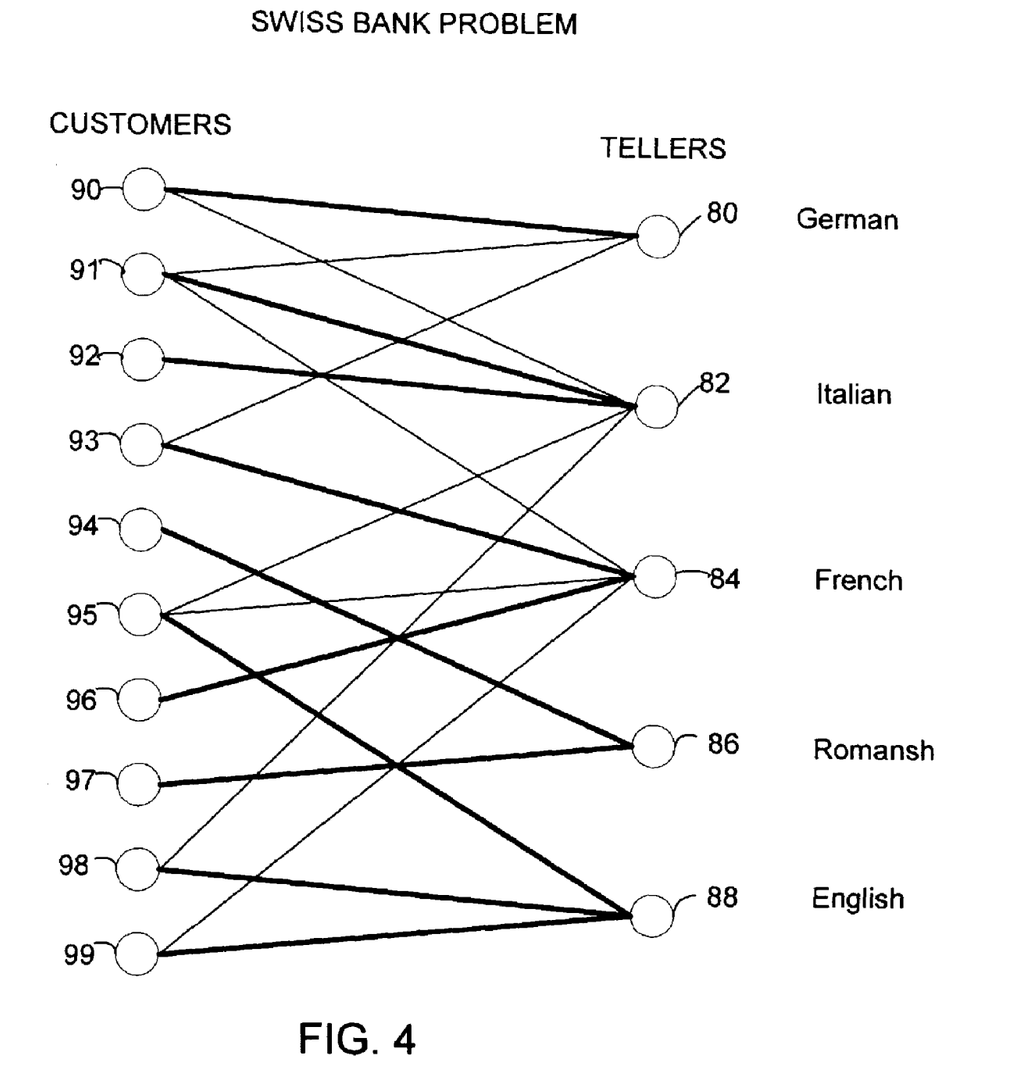
FIG. 4 is a schematic diagram showing the bipartite diagram of FIG. 2 with initial assignments indicated by edges shown in thick lines.

The initial round of assignments can be performed with some criteria (in addition to the given matching constraints) that are expected to bring the initial assignments close to the final, optimized, assignments. In other words, the criteria are used to provide a preliminary match that is potentially better than a match made by randomly assigning (under the matching constraints) the customers to the tellers. For instance, in one embodiment, in the initial assignment process, each customer is assigned to a teller that has the shortest queue among the tellers that speak the languages of the customer. By way of example, turning now to FIG. 4, in the first round of assignments, the first customer 90 is assigned to the German teller 80. The assignment is indicated in FIG. 4 by presenting the edge between the first customer 90 and the German teller 80 with a thick line. The second customer 91, who can speak German, Italian, and French, is assigned to the Italian teller 82, since the German teller 80 already has one customer while the Italian-speaking teller has none prior to the current assignment. The third customer 92, who speaks only Italian, is then assigned to the Italian teller 82. The remaining customers are assigned in the same way. The preliminary assignments are indicated by the thick edge lines. It can be seen that this first round of assignments has not produced an optimal matching between the customers and the tellers, as the queue lines of the tellers are uneven. Specifically, only one customer is assigned to the German teller 80, while three customers, more than the average number of customers per teller, are assigned to the English teller 88.

As mentioned above, different criteria may be used in the initial round of assignments to try to make the initial assignments close to the optimal assignments. For instance, in an alternative embodiment, customers that are more constrained (i.e., those speak fewer languages) are allowed to choose servers first. To that end, the customers are first sorted by the number of languages they can speak (or, equivalently, tellers they can talk to), with those customers that can speak only one language on the top of the list so that they will be assigned to the respective tellers first. The initial round of assignments then begins from the top of the list, using the same criteria as in the first embodiment described above, namely that each customer is assigned to one teller that has the shortest queue among the tellers that speak the languages of the customer. To keep the illustrations simple and focused, the result of this alternative way of making the initial assignments is not depicted in a Figure.

As mentioned above, after the first round of assignments is completed, the customer-teller match is optimized by making reassignments to even out the lengths of the queues of the tellers. This is carried out by iteratively applying a reassignment process. In the reassignment process, client reassignments are made along a chain of tellers beginning with the teller with a longest queue and ending with a teller with a queue shorter than the longest queue by at least two, such that each teller (except the last one in the chain) passes one client to the next teller in the chain. In one implementation, the teller with the longest queue is first identified. A search is then performed to identify the chain of tellers. This search first identifies a client assigned to this first teller, and finds a second teller connected to that client by an edge. If the second teller's queue is shorter than the first teller's queue by at least two, the search is over. Otherwise, the search continues by finding a client assigned to the second teller, and finding a third teller connected to that client by an edge. This search continues until a teller with a queue shorter than the queue of the first teller by at least two is found. The pseudocode of this search process may be presented as follows:

Unmark all right-hand vertices
Find an unmarked right-hand-side vertex ROOT that has the highest load
fImprovementFound=DoSearch(ROOT)

wherein the pseudocode for method DoSearch(u) may be presented as follows:

```
Mark(u)
If Load(u) <= Load(ROOT) - 2 then return TRUE
For each left-hand-side vertex v that is matched with u
    For each unmarked right-hand-side vertex w that is a neighbor of
    v
        If DoSearch(w) = TRUE then return TRUE
Return FALSE
```

Figure 5:
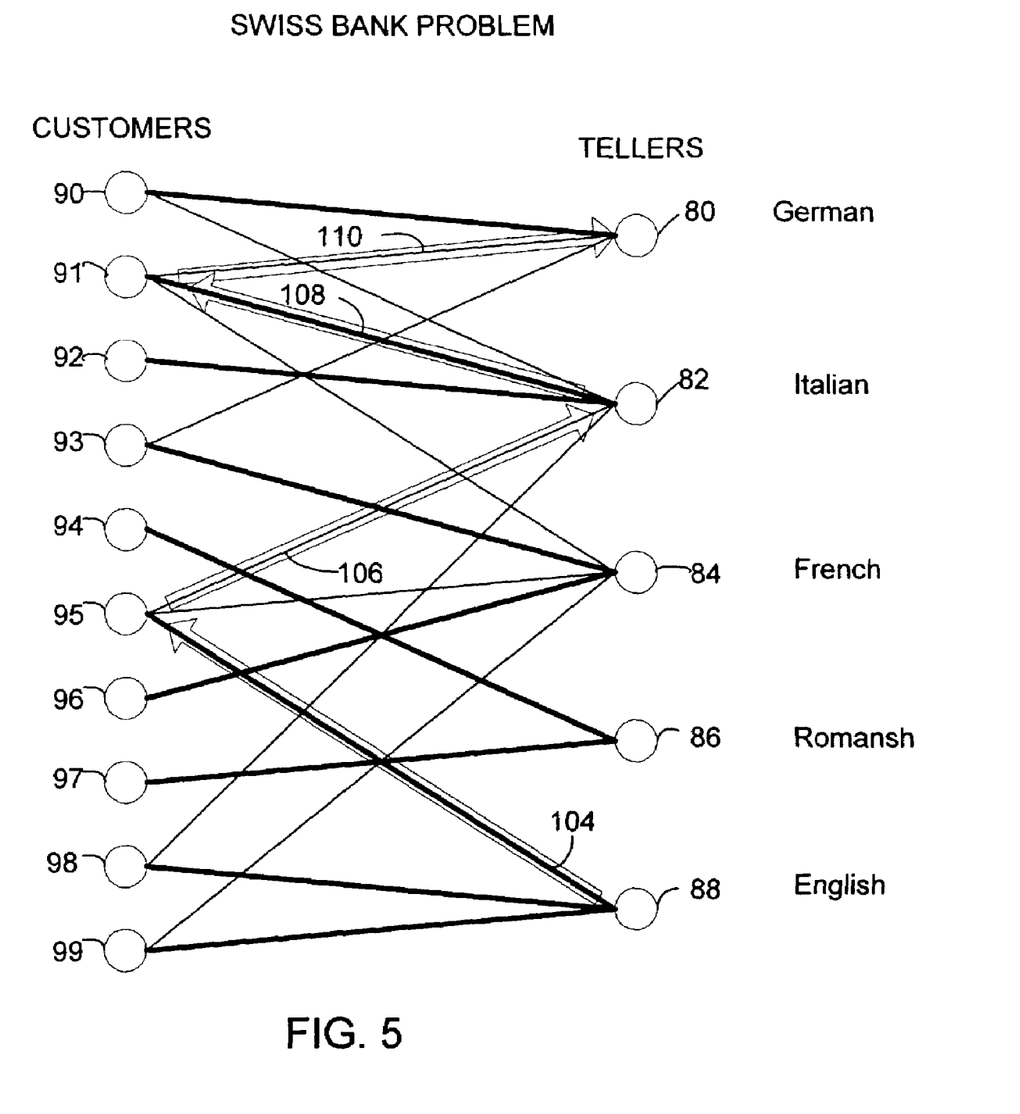
FIG. 5 is a schematic diagram showing the bipartite diagram of FIG. 4 with an alternating path identified in a search process.

By way of example, referring to FIG. 5, the English teller 88 initially has three customers 95, 98, and 99 assigned to her, the highest number of assigned customers among the tellers. A search performed in accordance with the pseudocode described above finds a chain of tellers including the English teller 88, the Italian teller 82, and the German teller 80, whose queue is shorter than the queue of the English teller by two. This search process also identifies an alternating path linking the English teller to the German teller. In FIG. 5, this alternating path 102 is identified by the sequence of arrows along the assigned edge 104 from the English teller 88 to the customer 95, the unassigned edge 106 between the customer 95 and the Italian teller 82, the assigned edge 108 between the Italian teller 82 and the customer 91, and the unassigned edge 110 between the customer 91 and the German teller 80. Thus, it can be seen that the alternating path is formed of alternating assigned and unassigned edges.

After identifying the chain of tellers starting with a teller with the longest queue and ending with a teller with a queue shorter than the longest queue by at least two, reassignments are made to shift one customer from the first teller to the second teller, another customer from the second teller to the third teller, and so one. Prior to the reassignment, the alternating path in the bipartite diagram may look like: $T_1-C_1-T_2-C_2- \ldots -T_N$, where T represents teller and C represents customer. Initially, $C_1$ is assigned to $T_1$, and $C_2$ is assigned to $T_2$, etc., and $Load(T_1) >= Load(T_N)+2$. The reassignment process shifts the client assignments along the alternating path such that $C_1$ is reassigned to $T_2$, $C_2$ to $T_3$, etc. As a result of the reassignments, $Load(T_1)$ is reduced by one, and $Load(T_N)$ is increased by one. This means that the loads of the tellers are more even, and total customer wait time is reduced.

Figure 6:
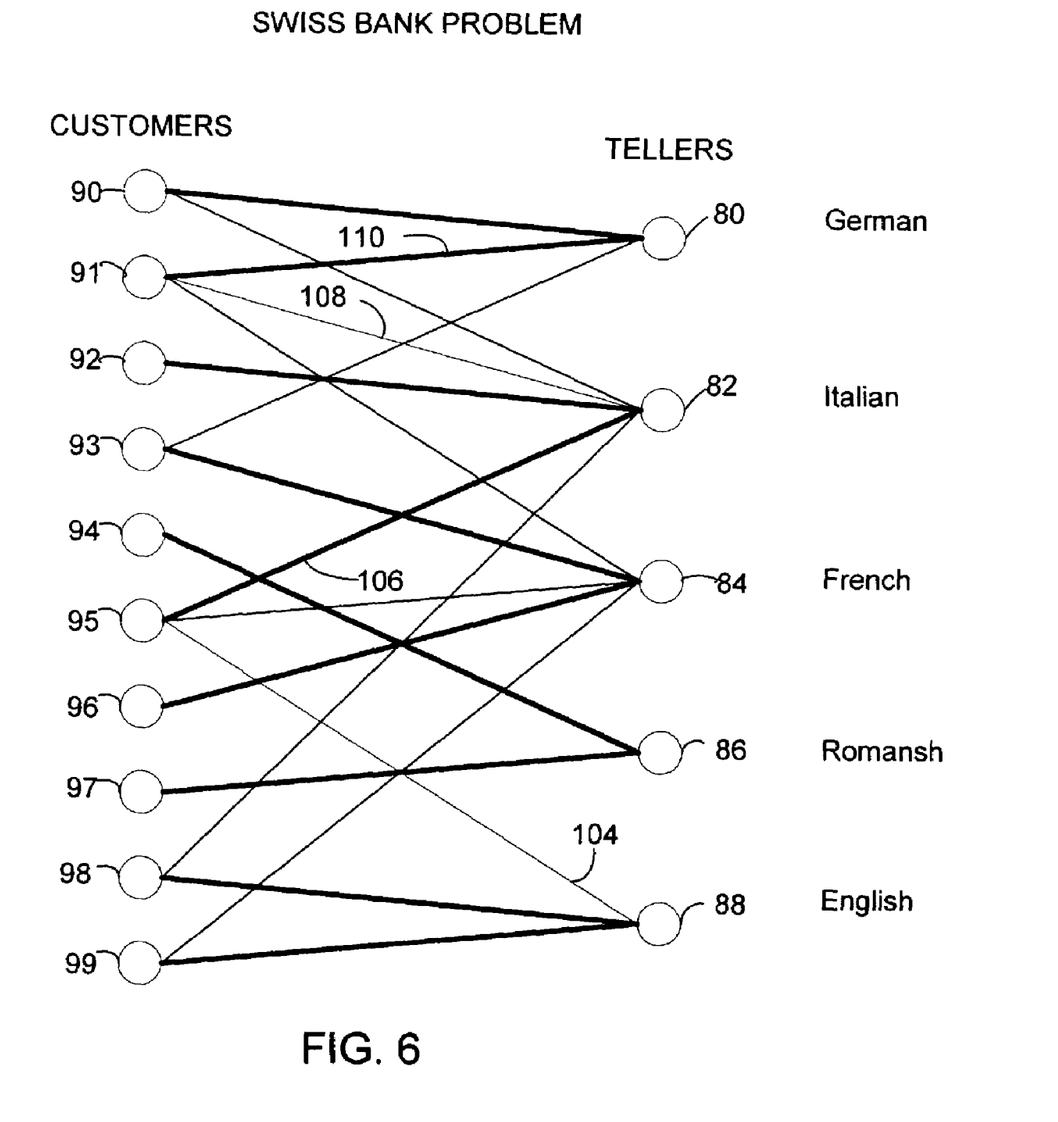
FIG. 6 is a schematic diagram showing a bipartite diagram for an optimized match obtained by making reassignments along the alternating path in the bipartite diagram of FIG. 5.
Figure 7:
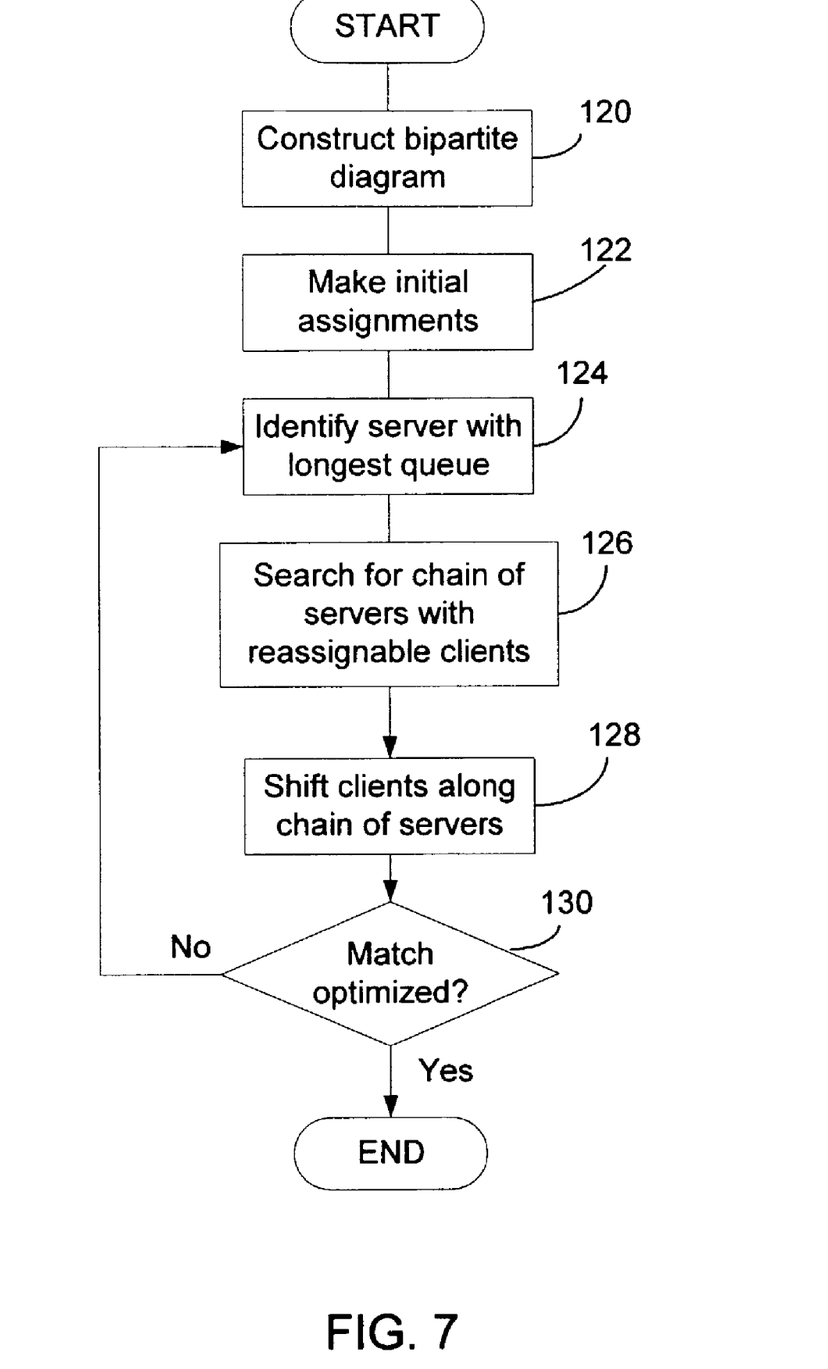
FIG. 7 is flow diagram summarizing the process of finding an optimized match between clients and servers under given matching constraints.

By way of example, the customer-teller match after one reassignment process is illustrated in FIG. 6. In comparison with the initial assignments illustrated in FIG. 4, the customer 95 has been taken from the English teller 88 and reassigned to the Italian teller 82, and the customer 91 has been taken from the Italian teller 82 and reassigned to the German teller 80. In this particular example, the customer-teller match is optimized after only one round of reassignments, with each teller now serving two customers. In many applications, however, the optimal match may require more rounds of reassignments until no further improvement can be made. It should also be noted that for a given set of clients and servers and their matching constraints there may exist different combinations of client-server assignments that are considered optimal. For instance, in the example or FIG. 6, instead of reassigning the customer 95 to the Italian teller 82, the customer 88 may be reassigned to the Italian teller, and the resulting assignments still constitute an optimal match because each teller is assigned with two customers.

The matching process described above is summarized in FIG. 7. For a given set of clients and available services and their matching constraints, a bipartite diagram is constructed (step 120), with the clients as vertices on one side (e.g., the left-hand side) and the available services as vertices on the other side, and with all the ways of pairing the clients and the services under the matching constraints presented as edges connecting the respective client and service vertices. An initial round of assignments is then made (step 122), preferably with certain criteria that will provide a good starting point for the subsequent optimization operation. During the optimization operation, a first server with the longest queue is identified (step 124). A search is then performed to find a chain of servers beginning with the first server and ending with another server having a queue length shorter than the longest queue by at least two, with each server in the chain except the last server having a client that can be re-assigned to the next server in the chain (step 126). These reassignable clients are then reassigned along the chain so that the queue of the first server is reduced by one and the queue of the end server is increased by one (step 128). If it is determined that the match is optimized (step 130), the matching process is terminated. If the matching process is not yet optimized, the operation returns to the step 124. Thus, the reassignment operation is repeated until an optimal match if reached.

As mentioned above, the matching method of the invention is applicable in many different scenarios for matching network clients and services. For instance, the method may be used for load balancing in the case of data replication in an Active Directory system. In the Active Directory system, directory data are divided into partitions. The system employs multiple domain controllers, each of which is a server that stores the directory data and may host multiple partitions. The replication of the directory data among the domain controllers are controlled by the use of connection objects, each of which indicating two domain controllers that should replicate data. Each connection may replicate several partitions. The load balancing issue concerning the data replication in the Active Directory system involves two problems or aspects. The first problem is which servers each connection should use to balance workload among the servers. The second problem is at what times the connections should replicate data in order to balance the workload throughout the day. As described below, each of these two problems can be solved using the method of the invention.

Figure 8:
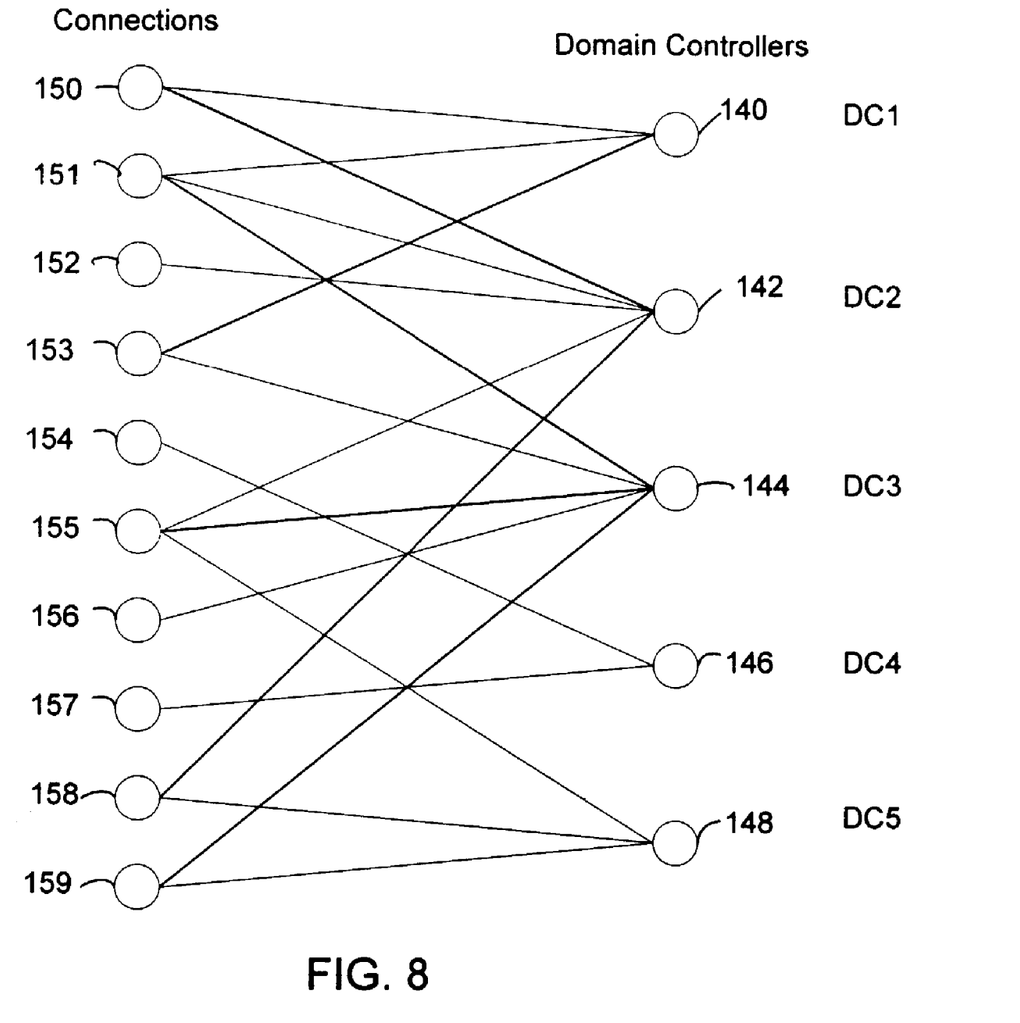
FIG. 8 is a schematic diagram showing a bipartite diagram for matching a plurality of replication connectors with a plurality of available domain controllers.

As shown in FIG. 8, the problem of balancing the workloads among the domain controllers 140, 142, 144, 146, and 148 is cast as a problem of finding an optimal match between the connections 150–159 and the domain controllers. Due to the partitions to be replicated, each connection can only be assigned to a subset of the domain controllers. For instance, the connection 150 can only be matched with either the domain controller 140 or the domain controller 142. In accordance with the method described above, the matching problem is presented in a bipartite diagram, with the connections shown as vertices on one side and the domain controllers as vertices on the other side, and all the allowable ways to pair the connections and the domain controllers as edges connecting the vertices. In this regard, the connections are the "clients" in a broad sense, and the domain controllers are the available "servers", in this client-server matching problem. The optimal matching between the connections and the domain controllers can then be found using the method described above.

Figure 9:
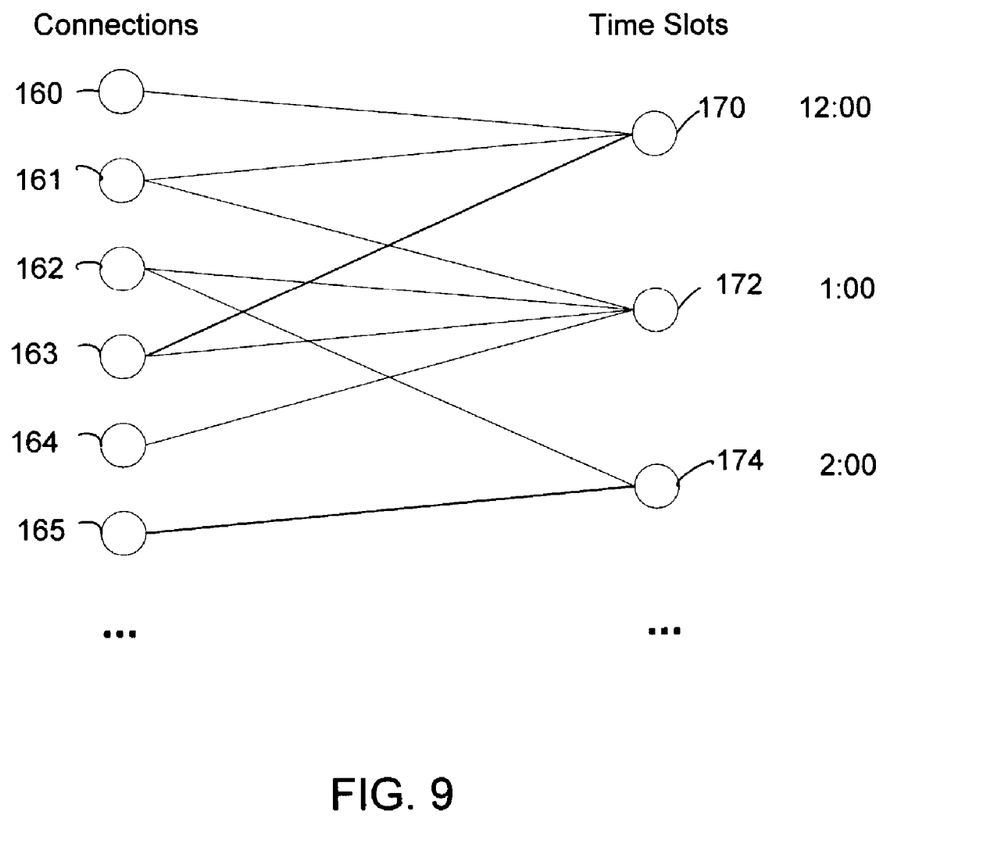
FIG. 9 is a schematic diagram showing a bipartite diagram for matching a plurality of replication connectors with a plurality of available time slots.

The problem of load balancing in terms of schedule staggering for data replication in the Active Directory system is illustrated in FIG. 9. In keeping with the invention, this problem is also presented as a bipartite diagram, with the connections 160-165 as vertices on one side and available time slots 170, 172, 174, etc., as vertices on the other side. Because of the schedules, each connection can only replicate in pre-selected time slots. For instance, the connection 160 can only replicate in the time slot starting at 12:00,1 while the connection 161 can replicate during the time slots beginning at 12:00 and 1:00. The scheduling constraints are presented as edges between the connection vertices and the time slot vertices. Thus, in this example, the connections are the "clients" and the time slots are the available "servers" of a client-server matching problem. The optimal solution of the matching problem can then be found using the method described above.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A computer-readable storage medium having computer-executable instructions for performing steps for matching a plurality of clients with a plurality of servers under given matching constraints, the steps comprising:

presenting the clients and servers as vertices and allowable client-server pairs as edges connecting respective vertices in a bipartite diagram and reflecting each client-server pairing allowable according to matching constraints;

making a preliminary round of assignments to tentatively assign each client to one server based on the matching constraints; and after making the preliminary round of assignments, optimizing the client-server pairings by performing the following:

identifying a server having a highest number of clients assigned thereto;

finding a chain of servers beginning with the server with the highest number of clients and ending with a server having a number of clients smaller than said highest number by at least two, each server in the chain except the server at the end of the chain having one client reassignable to the next server in the chain;

reassigning said reassignable clients along the chain such that the number of clients of the server at the beginning of the chain is reduced by one and the number of clients of the server at the end of the chain is increased by one and such that each server in the chain, except the server at the end of the chain, passes a client to a next server in the chain; and repeating the steps of identifying, finding, and reassigning until an optimal match between the clients and the servers is reached.

2. A computer-readable storage medium as in claim 1, wherein the step of finding includes searching for an alternating path in the bipartite diagram connecting the server having the highest number of clients to the server having a number of clients smaller than said highest number by at least two.

3. A computer-readable storage medium as in claim 2, wherein the step of making the initial round of assignments assigns each client to a server having a smallest number of assigned clients among servers to which said each client is assignable under the matching constraints.

4. A computer-readable storage medium as in claim 2, wherein the searching for the alternating path is performed recursively using the bipartite diagram.

5. A method for matching a plurality of clients with a plurality of servers by means of computerized processing, comprising:

presenting the clients and servers as vertices and allowable client-server pairs as edges connecting respective vertices in a bipartite diagram and reflecting each client-server pairing allowable according to matching constraints;

making a preliminary round of assignments to tentatively assign each client to one server based on the matching constraints; and after making the preliminary round of assignments, optimizing the client-server pairings by performing the following:

identifying a server having a highest number of clients assigned thereto;

finding a chain of servers beginning with the server with the highest number of clients and ending with a server having a number of clients smaller than said highest number by at least two, each server in the chain except the server at the end of the chain having one client reassignable to the next server in the chain;

reassigning said reassignable clients along the chain such that the number of clients of the server at the beginning of the chain is reduced by one and the number of clients of the server at the end of the chain is increased by one and such that each server in the chain, except the server at the end of the chain, passes a client to a next server in the chain; and repeating the steps of identifying, finding, and reassigning until an optimal match between the clients and the servers is reached.

6. A method as in claim 5, wherein the step of finding includes searching for an alternating path in the bipartite diagram connecting the server having the highest number of clients to the server having a number of clients smaller than said highest number by at least two.

7. A method as in claim 6, wherein the step of making the initial round of assignments assigns each client to a server having a smallest number of assigned clients among servers to which each client is assignable under the matching constraints.

8. A method as in claim 6, wherein the searching for the alternating path is performed recursively using the bipartite diagram.

9. A computer network comprising:
a plurality of servers;
a plurality of clients, each client of the plurality of clients being assignable to a subset of the servers under given matching constraints;
a matching module programmed to compute an optimal match of the clients with the servers by presenting the clients and servers as vertices and client-server pairs allowable under the matching constraints as edges in a bipartite diagram and reflecting each clinet-server pairing allowable according to matching constraints, making preliminary round of assignments to tentatively assign each client to one server under the matching constraints, and after making the preliminary round of assignments, optimizing the client-server pairings by performing the following:
finding a chain of servers beginning with a server having a highest number of clients assigned thereto and ending with a server having a number of clients smaller than said highest number by at least two, with each server in the chain except the server at the end of the chain having one client reassignable to the next server in the chain, reassigning said reassignable clients along the chain such that the number of clients of the server at the beginning of the chain is reduced by one and the number of clients at the end of the chain is increased by one and such that each server in the chain, except the server at the end of the chain, passes a client to a next server in the chain, and repeating the steps of identifying, finding, and reassigning until an optimal match between the clients and the servers is reached.

10. A computer network as in claim 9, wherein the matching module is programmed to perform the finding of a chain of servers by performing a recursive search for an alternating path in the bipartite diagram connecting the server with the highest number of clients to the server having a number of clients smaller than said highest number by at least two.

* * * * *